United States Patent [19]

Seizert et al.

[11] Patent Number: 5,057,267
[45] Date of Patent: Oct. 15, 1991

[54] APPARATUS AND METHOD FOR FORMING HOLLOW PARISONS OF VARIABLE WALL THICKNESS

[75] Inventors: Robert D. Seizert, Canton; James R. Osborne, Pontiac, both of Mich.

[73] Assignee: Solvay Automotive, Inc., Houston, Tex.

[21] Appl. No.: 463,264

[22] Filed: Jan. 10, 1990

[51] Int. Cl.$^5$ .............................................. B29C 47/22
[52] U.S. Cl. ..................................... 264/541; 264/167; 264/209.2; 264/313; 425/3; 425/381; 425/532; 425/465; 425/466
[58] Field of Search ............ 264/541, 540, 515, 209.2, 264/209.8, 167, 313; 425/465, 466, 381, 382.4, 532, 380, 192 R, 3

[56] References Cited

U.S. PATENT DOCUMENTS

| | | |
|---|---|---|
| 3,209,404 | 10/1965 | Hagen ................................. 425/466 |
| 3,346,918 | 10/1967 | Deleuze et al. ..................... 425/466 |
| 4,124,351 | 11/1978 | Garbuio .............................. 425/466 |
| 4,171,195 | 10/1979 | Klein et al. ......................... 425/381 |
| 4,382,766 | 5/1983 | Feuerherm ......................... 425/466 |
| 4,432,718 | 2/1984 | Wurzer ............................... 264/209.2 |

FOREIGN PATENT DOCUMENTS

| | | | |
|---|---|---|---|
| 58-212922 | 12/1983 | Japan | 425/466 |
| 62-116112 | 5/1987 | Japan | 264/541 |

Primary Examiner—Jeffery Thurlow
Attorney, Agent, or Firm—Willian Brinks Olds Hofer Gilson & Lione

[57] ABSTRACT

A parison forming device is disclosed for forming hollow polymer extrudes of variable wall thickness in either the circumferential or longitudinal directions, or in any combination thereof. The parison forming device consists of a die-head assembly and mandrel assembly, concentrically arranged, creating an annual opening. The inner or outer circumferential perimeter of the annular opening may be selectively modified at specific radial locations through radially displaceable slides positioned about the annular opening. The slides, attached to either the die-head assembly or mandrel assembly, may be actuated during parison formation via hydraulic or other methods so as to provide suitable wall thickness profiles for later finished polymer products.

34 Claims, 9 Drawing Sheets

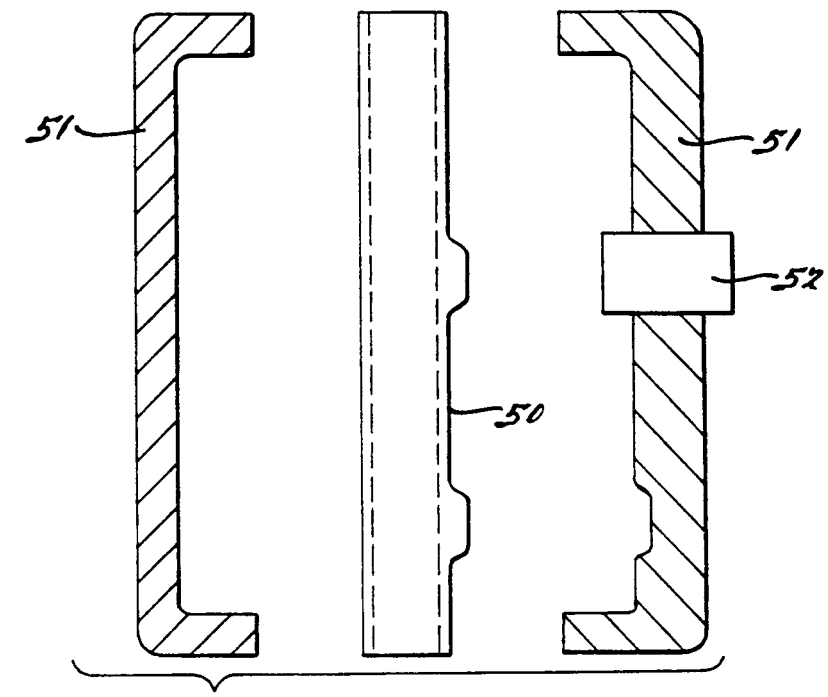
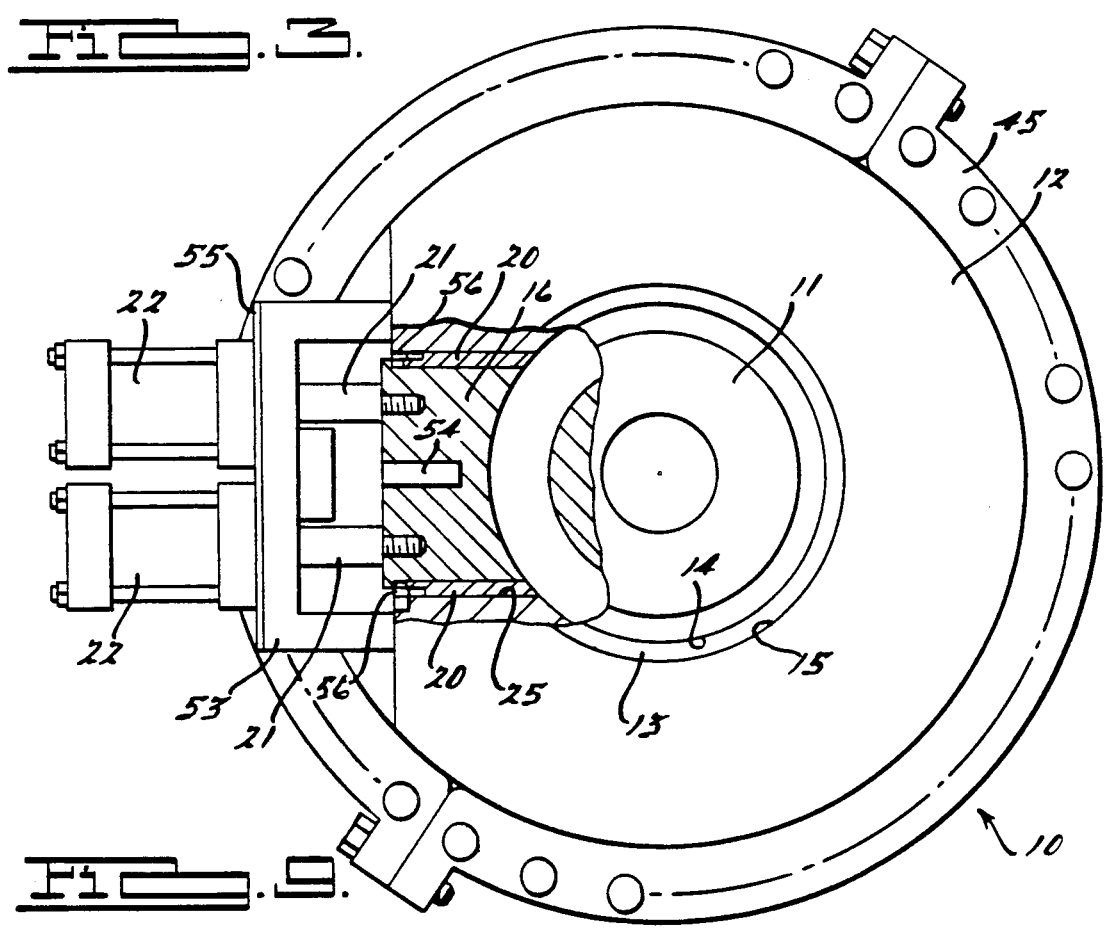

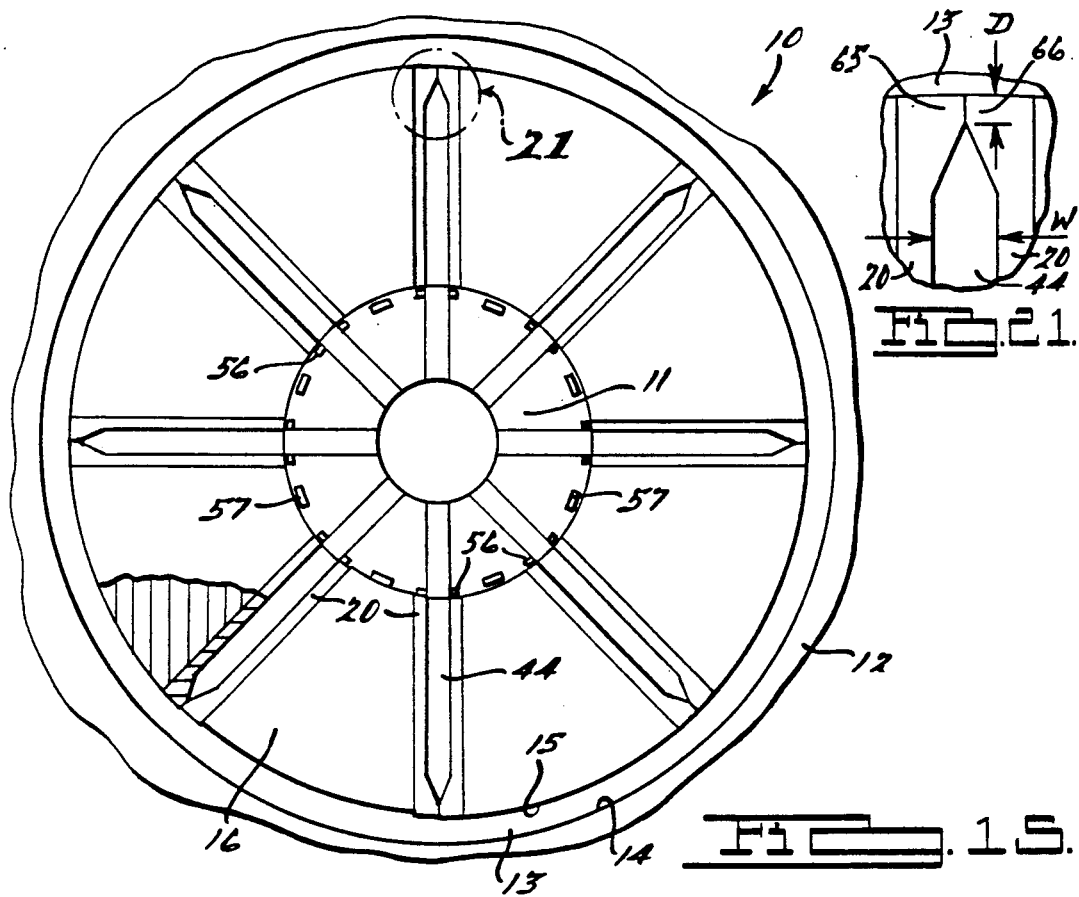
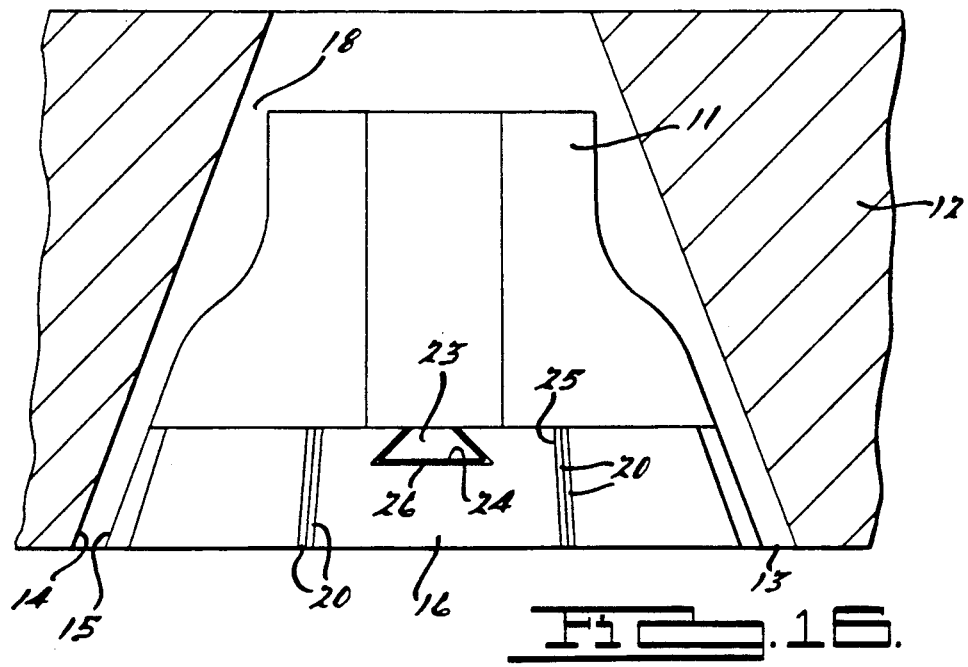

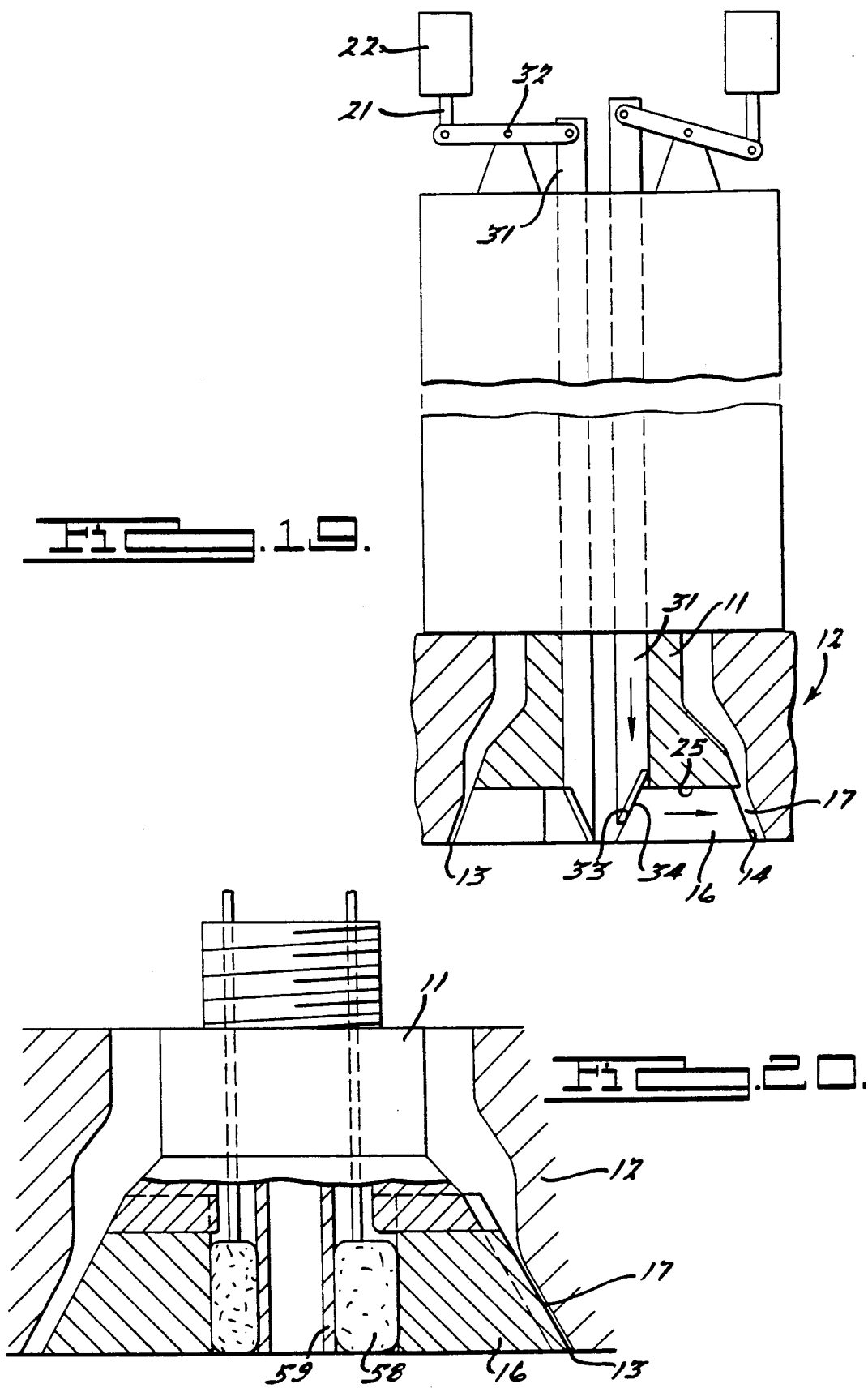

APPARATUS AND METHOD FOR FORMING HOLLOW PARISONS OF VARIABLE WALL THICKNESS

BACKGROUND OF THE INVENTION

1. Description of the Invention

This invention relates generally to an apparatus and method for forming hollow polymer extrudes. More specifically, the invention relates to an apparatus and method for forming hollow cylindrical parisons or extrudes of variable wall thickness. The wall thickness may be varied circumferentially and/or longitudinally over a wide range. The parison shot wall thickness may be simultaneously varied as the parison shot is extruded, providing variable wall thickness in the longitudinal direction.

2. Description of the Invention

During the formation of polymeric structures requiring hollow portions, it is common to extrude heated polymer materials through parison forming devices. These parison forming devices generally consist of an injection system, which receives solid polymer particles, raises the temperature of these polymer particles until they become a viscous liquid, and then forces this viscous liquid under pressure into an extruding die-head.

A general use of such devices is to provide parisons for subsequent forming into finished products, including plastic containers. Blow molding techniques are often employed. The finished products must be structurally capable to accomplish their intended use, but may suffer from extraneous material located in the product walls that undesirably increase the weight and cost. A general aim of the industry is to avoid these shortcomings consistent with the final product configuration. Variations in parison wall thickness often accommodate these configurations.

In one possible situation, it may be preferable for the finished product to have a uniform wall thickness, but the complicated geometry of the blow mold would prohibit such uniformity if a parison of uniform wall thickness were employed. This is in part due to different flow characteristics occurring in different local areas within the mold.

In another situation, it may be preferable for the finished product to have localized areas of increased wall thickness to provide additional strength or rigidity in the finished product, for example around an orifice. A parison of uniform wall thickness would not readily contribute to such variation.

Early attempts to provide parisons of variable wall thickness allowed such variation only longitudinally. The parison wallthickness, at any given longitudinal position along the parison's length or axis, still remained uniform in the circumferential plane.

Others have attempted to provide selective flow restrictions in the injector assembly, upstream of the die-head. These restrictions retard the flow rate of the viscous fluid at selected radial positions before the material enters the die-head. However, remote variation of local flow rates generally allows only a limited range of wall thicknesses, which may not be sufficient for final product structural requirements. Even if the annular opening is increased by forces exerted against the mandrel, which is thereby displaced to provide an annular opening allowing greater or lesser localized flow, this annular opening increase is likewise limited by the elastic limits of the mandrel material. Finally, remote flow restrictions are not able to accommodate wall thickness variations requiring focused local control (i.e., comprising only a few degrees of the circumferential diameter).

Flow restrictions arising from stress applied to external/internal collars or longitudinal movement of external/internal collars is also of limited utility. Displacement of one portion of the collar tends to induce displacement, per the material's Poisson's ratio, of the collar in other locations, thereby changing the flow characteristics in sometimes undesired ways. Further, significant stress is necessary to deflect the internal collars. Finally, the collar must not be stressed beyond its elastic limit.

Separating such collars into segments, which are displaced along the longitudinal axis of the mandrel, may be used to modify local parison shot wall thicknesses. However, it has been found that the effective operating range of longitudinally displaceable segments is limited, due to large displacements of the segments necessary in relation to the increase in gap of the annular opening. Also, the compression zone ratio, defined as the ratio of the compression zone inlet and outlet gap, may vary widely, inducing variations in material flow that may cause cavitation or other undesirable results.

Finally, past devices have not allowed for practical selective localized flow restrictions to occur simultaneously with the actual extrusion process. Many final product configurations require not only circumferential variations, but longitudinal variations at one or more sites. This again facilitates the flow characteristics of complex blow molding configurations, resulting in enhanced strength with lower material usage, weight and cost.

SUMMARY OF THE INVENTION

Therefore, to avoid these historical shortcomings, this invention provides circumferential variations in wall thickness of a parison of any material formable by the extrusion process by increasing or decreasing the annular opening at selected circumferential sites about the perimeter of a hollow parison shot. Further, the present invention allows simultaneous longitudinal variation of the parison wall thickness at selected longitudinal sites of the parison shot. The combined effect of circumferential and longitudinal variation of the wall thickness is to allow blow molding of complex shapes with a desired wall thicknesses at certain locations in the finished product.

The invention comprises a parison forming device which utilizes an annular opening. The annular opening, through which the viscous liquid polymer is passed, creates a hollow parison shot of an appropriate length, which later can be processed by well-known blow molding techniques into the final product of a polymer structure with one or more cavities, generally useful as containers or vessels. This annular opening is defined by an outer circumferential perimeter created by the die head assembly and a concentric inner circumferential perimeter created by the mandrel assembly.

Slides defining a portion or all of either the inner or outer circumferential perimeter and attached to either the die head assembly or mandrel assembly, respectively, are displaceable in the radial direction. These slides are then actuated to either increase or decrease the local annular opening gap, allowing localized variations in wall thickness. These slides may be attached to the assemblies in a variety of ways, from simple confinement in the surface of the circumferential perimeter to engaging a slot in the slide onto a corresponding "dove tail" projection on the assembly. Various means may be used to move the slides in the radial direction. These include fixed threaded set screws, direct linkages, sliding beveled mating surfaces, hydraulics, and electromagnetic actuation. Further advantages can be accomplished by adding control devices to the apparatus to effect the slide position during actual formation of the parison, allowing greater complexity in wall thickness variation.

The use of control devices allows the variation of parison wall thickness at selected circumferential and longitudinal sites based upon a programmed, preselected profile which can be executed during the formation of the parison shot and modified easily by simple variations in the sequence of actuation of the actuators for the slides located about the inner or outer circumferential perimeter of the annular opening.

The invention also provides for variation of the parison shot wall thickness at selected circumferential and longitudinal sites without requiring additional costs for specially designed cooling jackets, required to cool internal structures that would ordinarily be utilized for such features.

The method of obtaining the variation in wall thickness includes use of slides attached to either the mandrel or the die-head at either the inner or outer circumference of the annular opening. Alternatively, variation in wall thickness may be accomplished using slides either integral with or pivotally connected to the die-head such that external actuation results in increases or decreases in the annular opening as described above.

These and other objects and advantages of the present invention can be further understood by reference to the specification and drawings as provided herein.

BRIEF DESCRIPTION OF THE DRAWING

FIG. 3 is a cross sectional view, along the longitudinal axis, of an extruded parison with varying wall thicknesses prior to die mold closure and formation via blow molding;

FIG. 4 is a cross sectional view, along the longitudinal axis, of the finished product subsequent to die mold closure and blow molding;

FIG. 9 is a cross sectional view of the die-head shown in FIG. 2 taken perpendicular to its axis;

FIG. 15 is a cross sectional view of the mandrel, comprising the fifth embodiment, taken perpendicular to its axis, where the range of motion of the slides may be determined;

FIG. 16 is an elevated view along the longitudinal axis of the mandrel shown in FIG. 11, where the slides are attached to the mandrel so as to provide an adjustable inner circumferential perimeter;

FIG. 19 is a cross sectional view of the eighth embodiment showing a mandrel with a mechanical linkage system engaging reciprocal beveled mating surfaces of the actuating member and the slide;

FIG. 20 is a cross sectional view of the ninth embodiment of a mandrel with hydraulically inflated sacs as actuators; and FIG. 21 is an enlarged view of the corners of two slides as shown in FIG. 15.

DETAILED DESCRIPTION OF PREFERRED EMBODIMENTS

Figure 1:
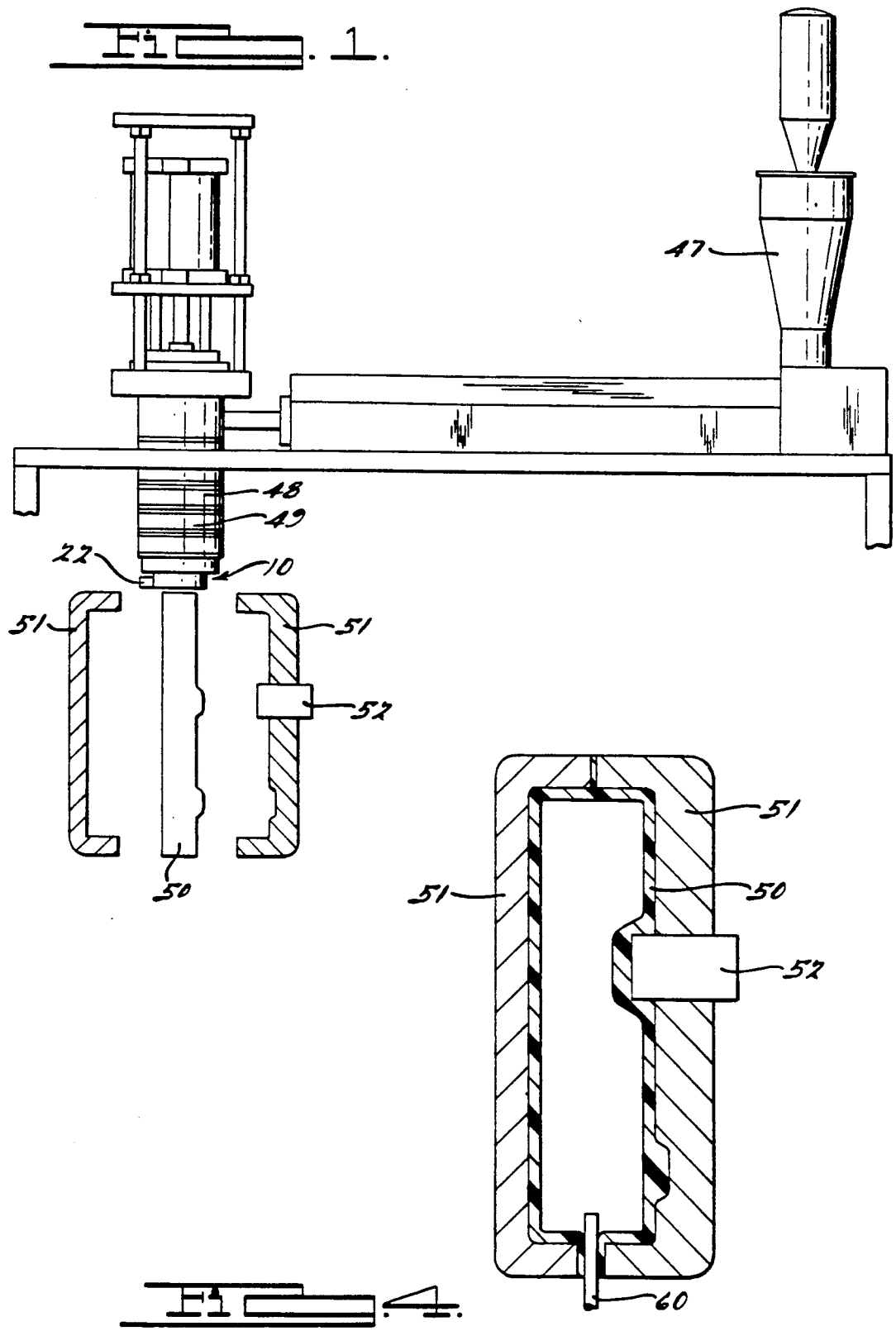
FIG. 1 is an overall view of a parison forming device equipped to extrude parisons of variable wall thicknesses according to the invention.

FIG. 1 shows the general configuration and components of a parison forming device including a solid polymer pellet feed system 47, polymer heating coils 48, a polymer accumulation head 49 and the parison forming extruder 10.

Once the parison 50 has been fully extruded, generally at temperatures of about 400° F., the top and bottom portions are generally sealed and cut except for a small inlet to allow air to enter the internal cavity via an injection needle 60, as shown in FIG. 3. The die molds 51 are then positioned about the extruded parison 50, completely encapsulating the extruded parison 50 except for flashing that occurs around the seam of the joined die molds 51. This flashing is later removed and recycled. Once encapsulated, the extruded parison 50 is inflated so as to conform to the interior surface of the die mold 51, where external communication is generally provided via removable core plugs 52, as seen in FIGS. 3 and 4.

Figure 5:
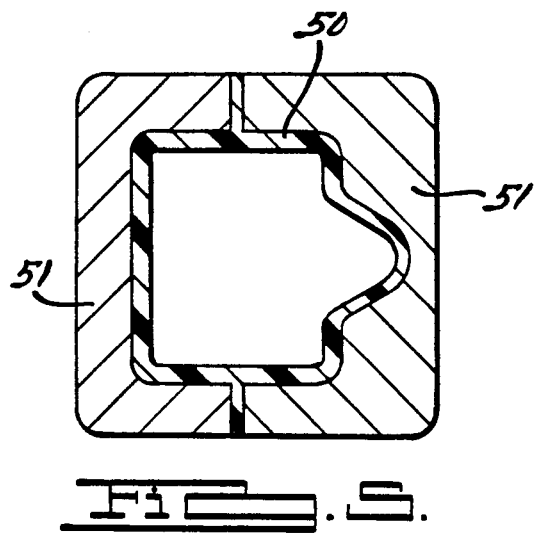
FIG. 5 is a cross sectional view, along the longitudinal axis, of a finished product formed within a complex mold from a parison of uniform wall thickness.
Figure 6:
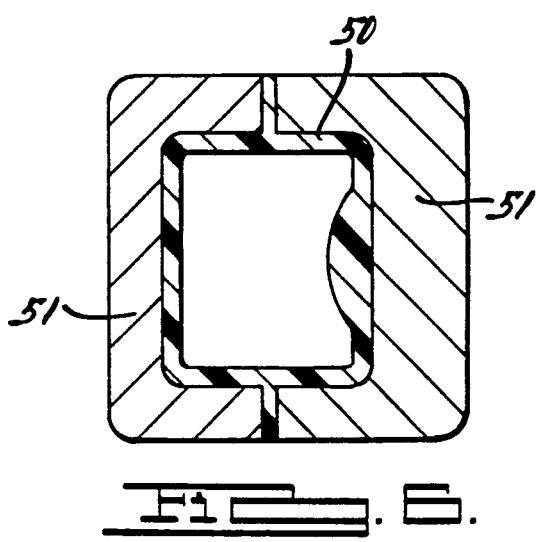
FIG. 6 is a cross sectional view, along the longitudinal axis, of a finished product formed within a mold from a parison of radial wall thickness variation.
Figure 7:
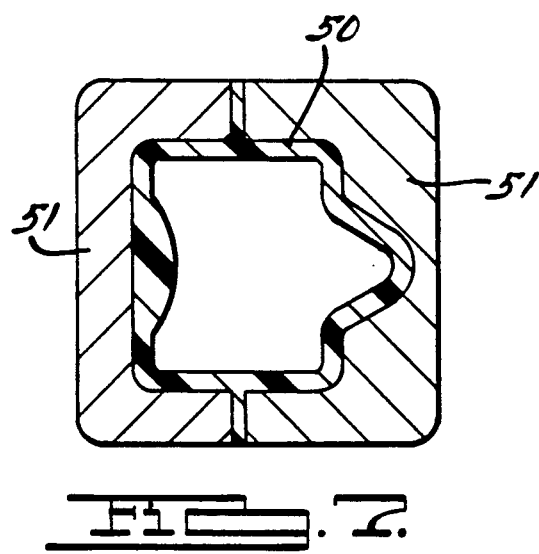
FIG. 7 is a cross sectional view, along the longitudinal axis, of a finished product formed within a complex mold from a parison of longitudinal wall thickness variation.
Figure 8:
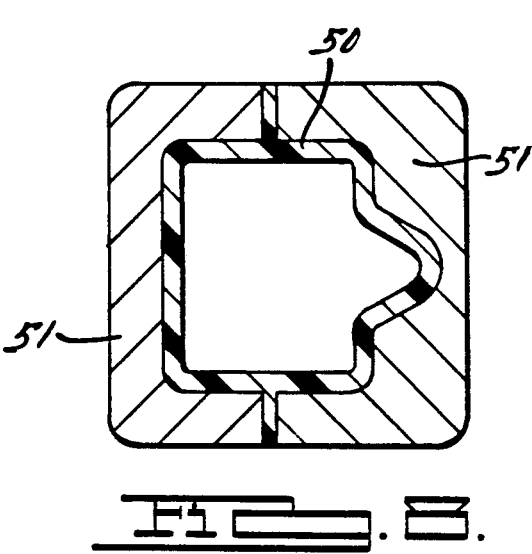
FIG. 8 is a cross sectional view, along the longitudinal axis, of a finished product formed within a complex mold from a parison of radial wall thickness variations.

FIG. 5 shows the effect that a parison 50 of uniform wall thickness has when formed within die molds 51 of complex configurations. As can be readily seen, the wall thickness at interior die molds 51 discontinuities can be significantly less than desired. Similarly, as can be seen in FIG. 6, the finished product may require localized deposits of parison 50 material at discrete locations so as to increase the parison 50 wall thickness, which for example, may allow subsequent machining processes. Efforts to increase the wall thickness of the parison 50 at longitudinal locations so as to result in a uniform radial wall thickness may allow compensation for die mold 51 discontinuities, but also will result in excess material deposits at locations that do not require extra material, as can be seen in FIG. 7. Accordingly, the desired result, accomplished with the instant invention, may be seen in FIG. 8 as resolving the complex die mold 51 configuration and thinner wall thickness, yet also avoiding excessive material deposits on the finished product.

Figure 2:
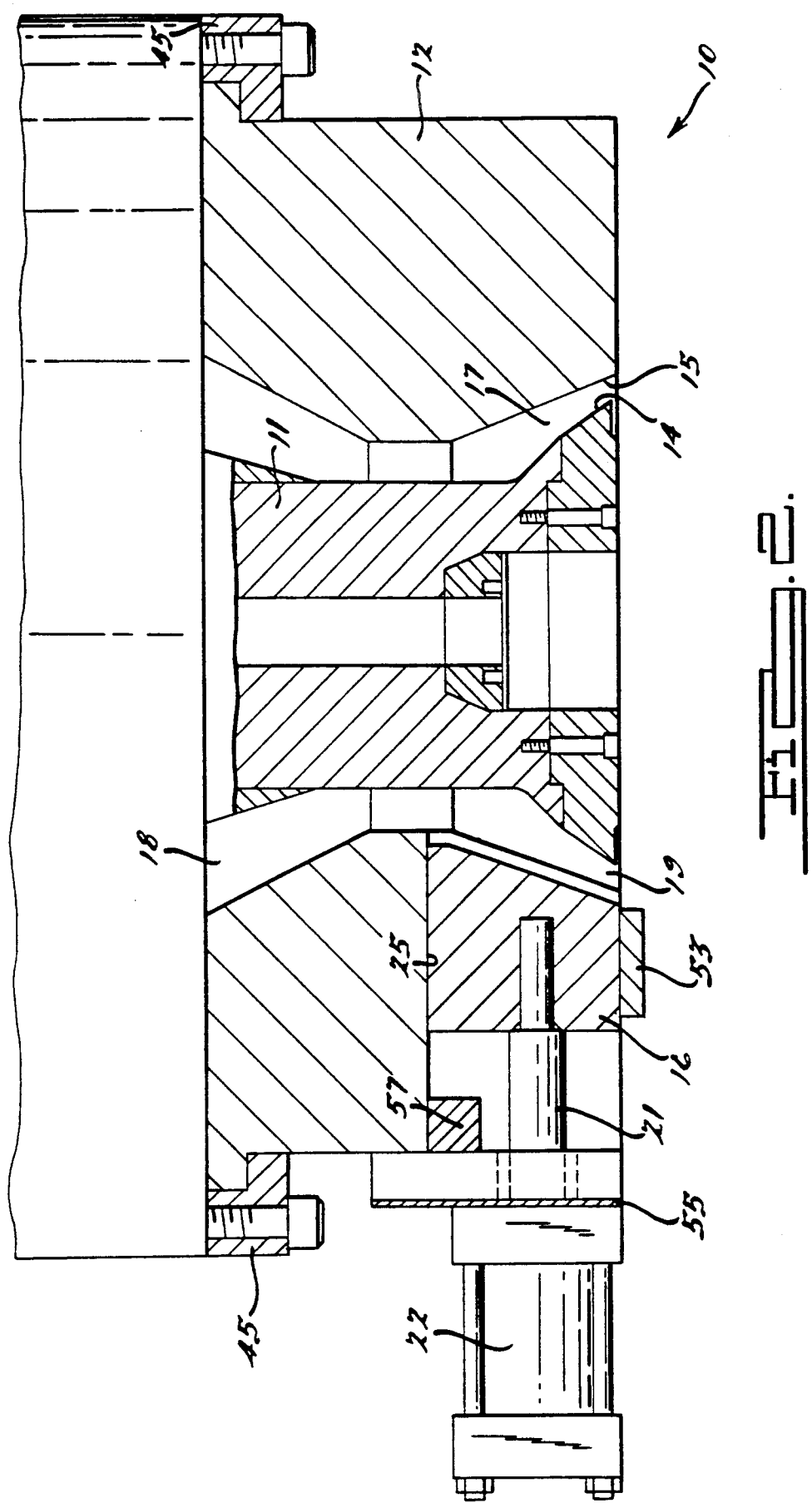
FIG. 2 is a cross sectional view, along the longitudinal axis, of the first embodiment of an extruding die head assembly and mandrel assembly as situated in the apparatus shown in FIG. 1.

FIG. 9 shows a preferred embodiment of the invention. The properly positioned mandrel assembly 11, concentric to the die-head assembly 12, results in an annular opening 13 created by an inner circumferential perimeter 14 and an outer circumferential perimeter 15. At least one radially displaceable slide 16 is located so that one surface of the radially displaceable slide 16 comprises a portion of the outer circumferential perimeter 15 of the annular opening 13. Mounted within the die-head assembly 12, the radially displaceable slide 16 is limited to radial motion by a slide retaining bracket 53, as seen in FIGS. 2 and 9. The radially displaceable slide 16 is most advantageously constructed of Ampcoloy beryllium copper to provide uniform heat transfer of heat generated within the slide heat cartridge 54. A heat cartridge 54 is used to avoid local loss of thermal energy from the parison 50 during the extrusion process, which can result in premature local cooling and solidification of the extruded parison 50. A surface coating of nickel-Teflon is recommended to reduce wear on all interacting components.

Figure 14:
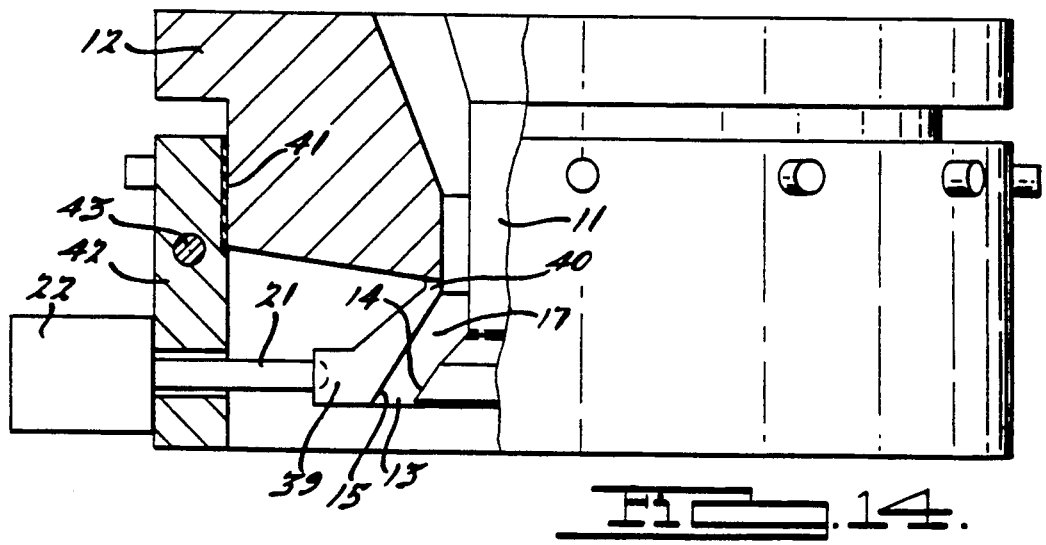
FIG. 14 is a cross sectional view of the die-head assembly comprising the fourth embodiment taken along its longitudinal axis, showing a flexible slide attached and integral to the die-head assembly.

The radially displaceable slide 16, as installed in FIGS. 2 and 9, is preferably actuated via dual hydraulic cylinders 22 operating through paired actuation stems 21. DC motors may be used, but response may be slower. Cooling to the hydraulic cylinder 22 housing and mica insulation 55 between the die-head assembly 12 and the hydraulic cylinder 22 is preferred as a means to extend hydraulic cylinder seal durability. The hydraulic system is easy to install using the existing hydraulic and cooling systems of the extruder, without requiring additional wiring circuits. Heat is preferably removed from the hydraulic cylinder 22 by a water cooling jacket 42 equipped with internal passages 43 attached to the die-head assembly 12, as seen in FIG. 14. This cooling jacket is separated by a thin layer of insulation 41 from the die-head assembly 12.

The slide 16 is situated so that the upper horizontal surface of the slide channel 25, in the longitudinal axis, is located upstream of compression zone 17, so that the slide 16 and die-head 12 interface occurs on a vertical surface as seen in FIG. 2. This configuration improves the flow characteristics of the viscous liquid and avoids discontinuities in parison 50 material delivery.

Figure 10:
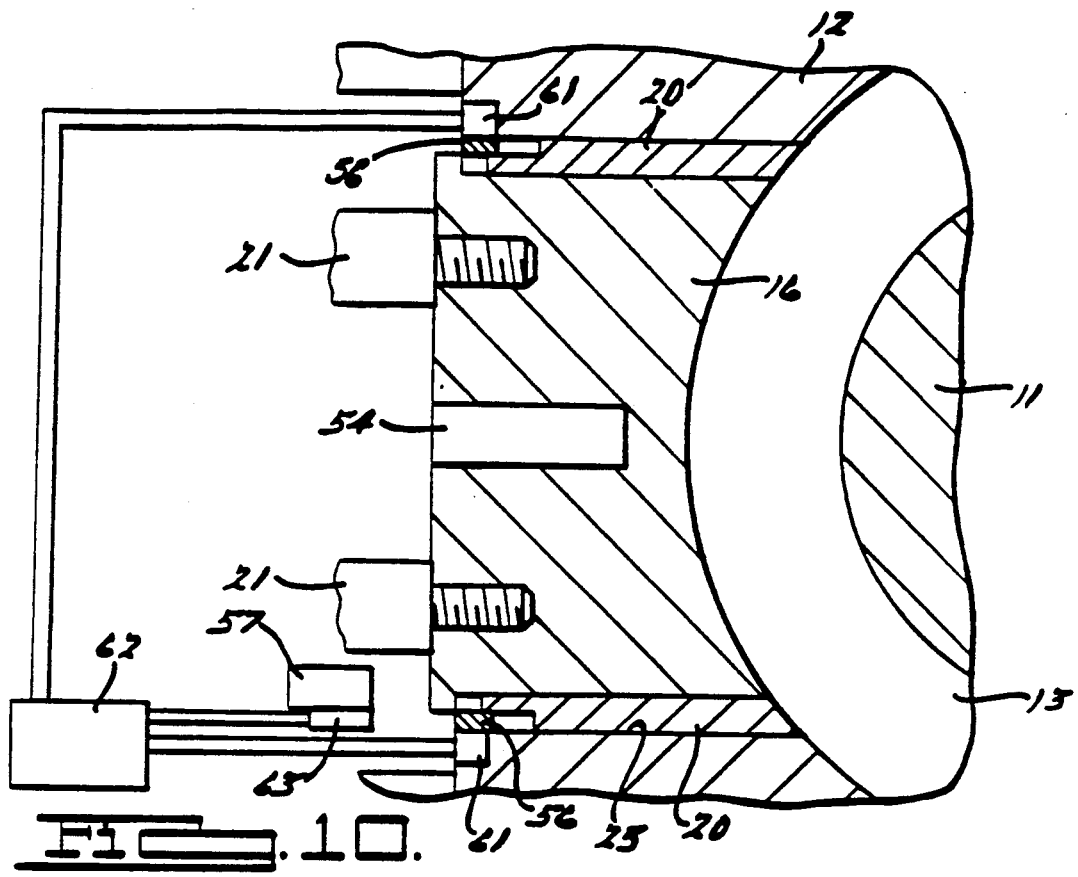
FIG. 10 is also a cross sectional view of the die-head shown in FIG. 2 taken perpendicular to its axis, showing the arrangement of the slide and slave slide prior to actuation.
Figure 11:
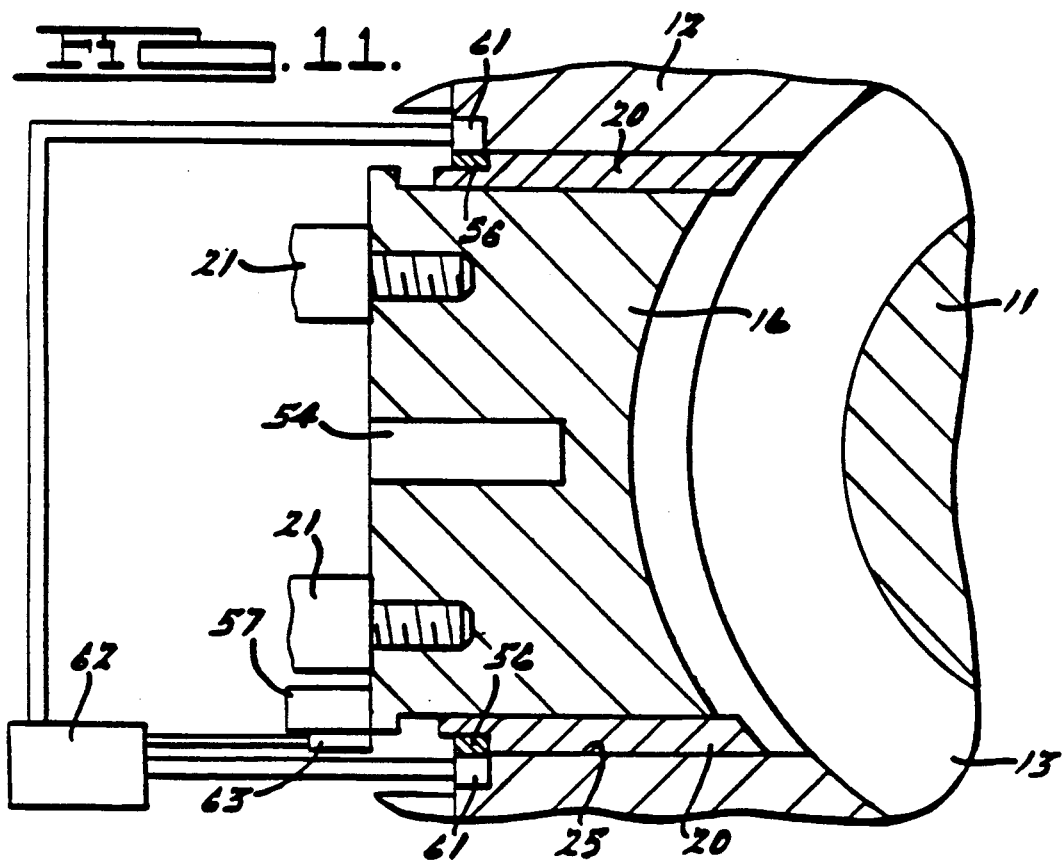
FIG. 11 is the same view shown in FIG. 6, showing the arrangement of the slide and slave slide after actuation.

Adjacent to each side of every radially displaceable slide 16 is one or more slave slides 20, also constructed of Ampcoloy beryllium copper, as shown in FIGS. 10 and 11. The slave slides operate in unison with the radially displaceable slide 16. The slave slide 20 is flush with the outer circumferential perimeter 15 when the radially displaceable slide 16 is also so positioned, as can be seen in FIG. 10. By use of slave slide stops 56 located so as to intercept the slave slide 20 as it moves in the outward radial direction, the slave slide 20 motion can be regulated to only a portion of the total distance transversed by the radially displaceable slide 16. Motion of the slave slide 20 in the radially outward direction can be accomplished by releasing the slide actuator 22 and utilizing the pressure generated in the compression zone 17 during the extrusion process, as seen in FIG. 2.

The result of regulated slave slide 20 motion is a "step" between the operating surface of the outer circumferential perimeter 15 and the surface of the radially displaceable slide 16, as shown in FIG. 11. Thus, a more gradual transition between these discontinuous surfaces may result, avoiding undesirable material flow characteristics normally associated with such discontinuous surfaces. Preferably, the adjustability of the slave slide stop 56 may be performed remotely via a slave slide stop motor 61 controlled via a stop controller 62 within a continuously variable range. Alternately, the slave slide 20 motion adjustability may be regulated by modification or replacement of the slave slide stop 56.

The total displacement of the radially displaceable slide 16 is controlled via slide stops 57, as shown in detail in FIGS. 10 and 11, located along the path traversed by the radially displaceable slide 16. Alternatively, the slide stops 57 may be incorporated into the actuator itself, generally as a mechanical limitation on total actuator 22 displacement. The slide stop 57 is also preferably adjustable by remote means with a slide stop motor 63 controlled via a stop controller 62 within a continuously variable range. Alternately, provisions may be made to facilitate convenient replacement or modification of the slide stop 57 to provide variable gap control for varying applications. One such provision is to utilize a two-piece split die ring 45, securing the die-head to the extruder as shown in FIG. 2, to allow ready removal of the die-head assembly 12 without requiring prior removal of the hydraulic cylinders 22 or actuation stems 21. The die-head assembly 12 so removed then allows ready access to the slide stop 57 for replacement or modification. The split die ring 45 is essentially a conventional die ring divided into equal halves, which are joined together at 180 degree intervals.

Figure 12:
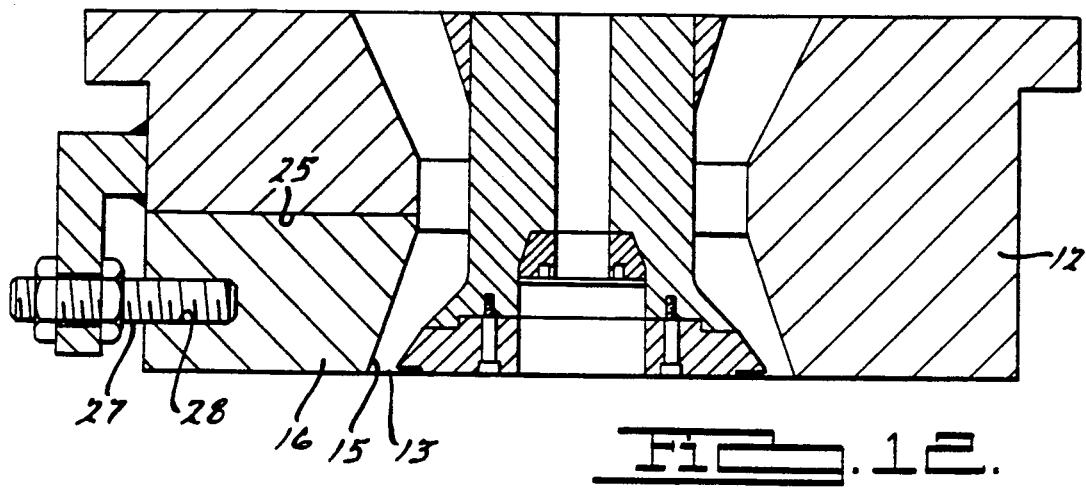
FIG. 12 shows a cross sectional view of a second embodiment of the die-head parallel to its axis showing the threaded members protruding through the die-head and engaging a tapped recess in said slide.

FIG. 12 shows another embodiment, where the radially displaceable slide 16 is attached to the die-head assembly 12 by a threaded member 27 that protrudes through the die-head assembly 12 into a tapped recess 28 located on the radially displaceable slide 16. Rotation of the threaded member 27 results in the radially displaceable slide 16 being moved in the radial direction. Rotation in the clockwise direction will result in increases in the local annular opening 13 by outward movement of the outer circumferential parameter 15 so as to increase the parison 50 wall thickness in the manner shown in FIG. 3. Rotation of the threaded member in the contraclockwise direction results in corresponding decreases in the local annular opening 13 as said slide 16 moves radially inward so as to decrease the parison 50 wall thickness in the manner shown in FIG. 3.

Figure 13:
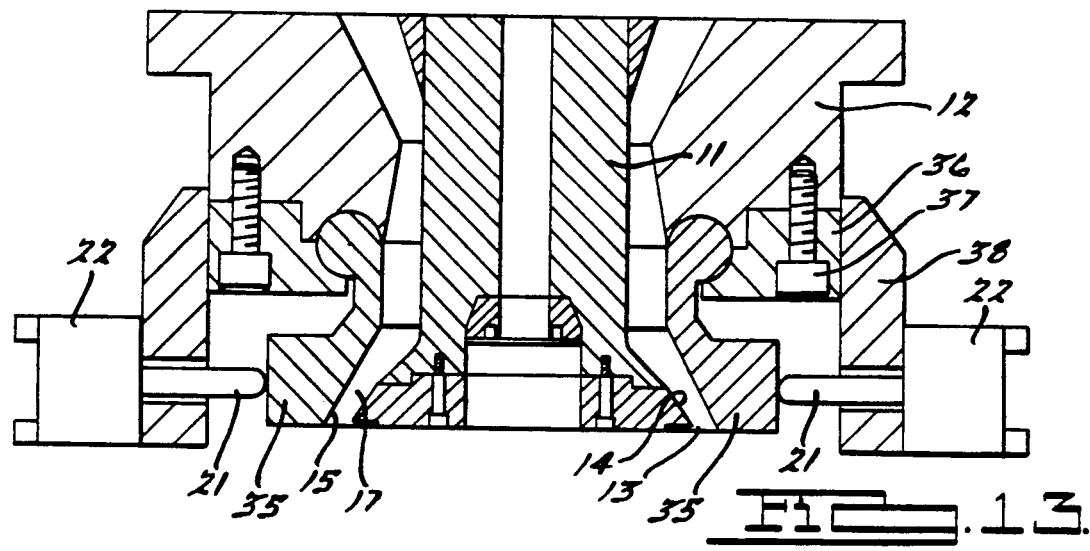
FIG. 13 is a cross sectional view of the die-head assembly comprising the third embodiment taken along the longitudinal axis, showing said slide pivoting about a fixed location in the die-head.

FIG. 13 shows an embodiment comprising pivoting slides 35 located on the extruder or die-head assembly 10 and held in place by an insert clamp 36, which is fastened to the die-head assembly 12 via a counter-sunk fastener 37. An actuator stem 21 is in contact with the pivoting slide 35 and is held in place with a die-head collar 38. Motion of the actuator in the inward radial direction causes the slide 35 to move into the compression zone 17, thereby further constricting the flow of material at the outer circumferential perimeter site 15. Pressure generated in the compression zone 17 during the extrusion process can be utilized to move the pivoting slide 35 in the outward radial direction and may be so utilized by merely retracting the actuation stem 21.

An additional embodiment is shown in FIG. 14, where the slide 39 is integral with the die-head assembly 12. The slide 39 is preferably fabricated from the die-head assembly 12 by high-voltage cutting methods, where material is removed so as to create a flexible interface 40 of about ⅜ inch wall thickness and where the slide 39 is free to travel in the radial direction without restraint caused by the rigidity of the die-head assembly 12. The resulting configuration is one or more slides 39 arranged about the outer circumferential perimeter 15 which may be displaced relative to the die-head assembly 12 in the radial direction by the actuator 21. Since each slide 39 is separated, in the horizontal plane, by a clearance between it and neighboring slides 39 on the remaining outer circumferential perimeter 15, each slide 39 may be actuated independently and without undesired influences at other radial locations about the outer circumferential perimeter 15. The slide 39, when the actuator 21 is retracted, will tend to return to its original position and become flush with the outer circumferential opening 15, owing to the elastic nature of the material at the flexible interface 40 and pressures existing at the pressure zone 17.

A further embodiment may be seen in the different views provided in FIGS. 15 and 16. The radially displaceable slides 16, located at the compression zone 17 of the parison outlet 19, above the material inlet 18, as shown in FIG. 16, are attached to the mandrel assembly. This embodiment has the advantage of compactness and enhanced material savings. As the embodiment is shown in FIGS. 15 and 16, the slides 16 are separated by slide spacing 44 so as not to interfere with one another as they operate along their range of motion, both radially inward and outward. As shown in FIG. 21, adjacent corners 65, 66 of slides 16, will come in contact with each other for a very short distance, D. In a preferred embodiment distance D has been as short as 0.03 inch. Further along the slides 16, a gap opens to a width, W. In a preferred embodiment, the width W is approximately twice the distance D. In effect, a slight interference will exist at the corners 65, 66, but it will be so slight that it will not hinder the performance of the slides 16 in moving radially in and out. Of course, many variations could be incorporated into the slides shown in FIG. 21, which would fall within the scope of this invention.

The annular opening 13 is opened or closed at the selected inner circumferential parameter 14 site. The radially displaceable slide 16 can be attached to the mandrel by a projection 23 integral with the mandrel assembly. The slide is equipped with an integral slot 24 that engages the mandrel projection 23 to form a slide channel 25 assisted by a lubricant 26, allowing radial displacement in both the inward and outward direction. As discussed for the embodiments utilizing a die slide, slave slides 20 are preferred to avoid discontinuous surfaces.

The dovetail attachment arrangement shown in FIG. 16 can be used in all embodiments wherein the slide channel 25 is utilized as a means to attach the radially displaceable slide 16 onto the mandrel assembly 11. This configuration may also be used to attach the segment 16 to the die-head assembly 12.

Figure 17:
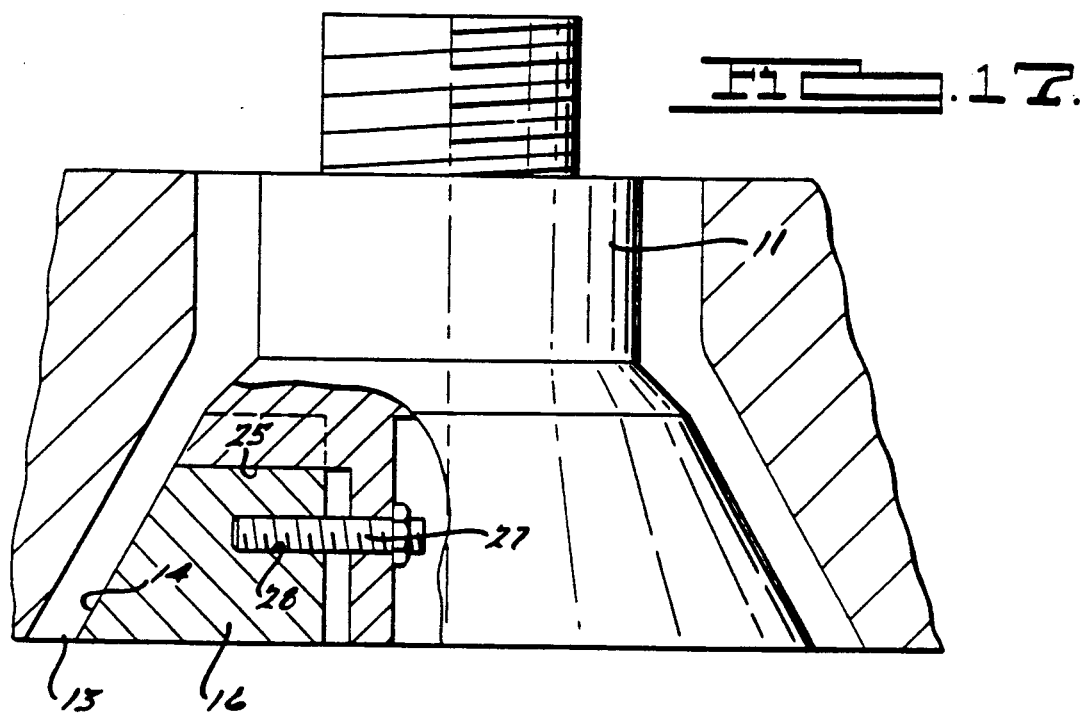
FIG. 17 is a cross sectional view of a mandrel comprising the sixth embodiment showing the movable slides actuated by a mechanical means comprising threaded members protruding through the mandrel assembly and engaging a tapped recess in the segment.

In the embodiment shown in FIG. 17, a means to actuate the radially displaceable slide 16 in the radial direction is shown. Threaded member 27 protrudes through the mandrel assembly 11 into a tapped recess 28 on the radial displaceable slide 16. Rotation of the threaded member 27 results in the radially displaceable slide 16 being moved in the radial direction. Rotation in the clockwise direction will result in increases in the local annular opening 13 by inward movement of the inner circumferential parameter 14 so as to increase the parison 50 wall thickness in the manner shown in FIG. 3. Rotation of the threaded member in the contraclockwise direction results in corresponding decreases in the local annular opening 13 as said slide 16 moves radially outward, so as to decrease the parison 50 wall thickness in the manner shown in FIG. 3.

Figure 18:
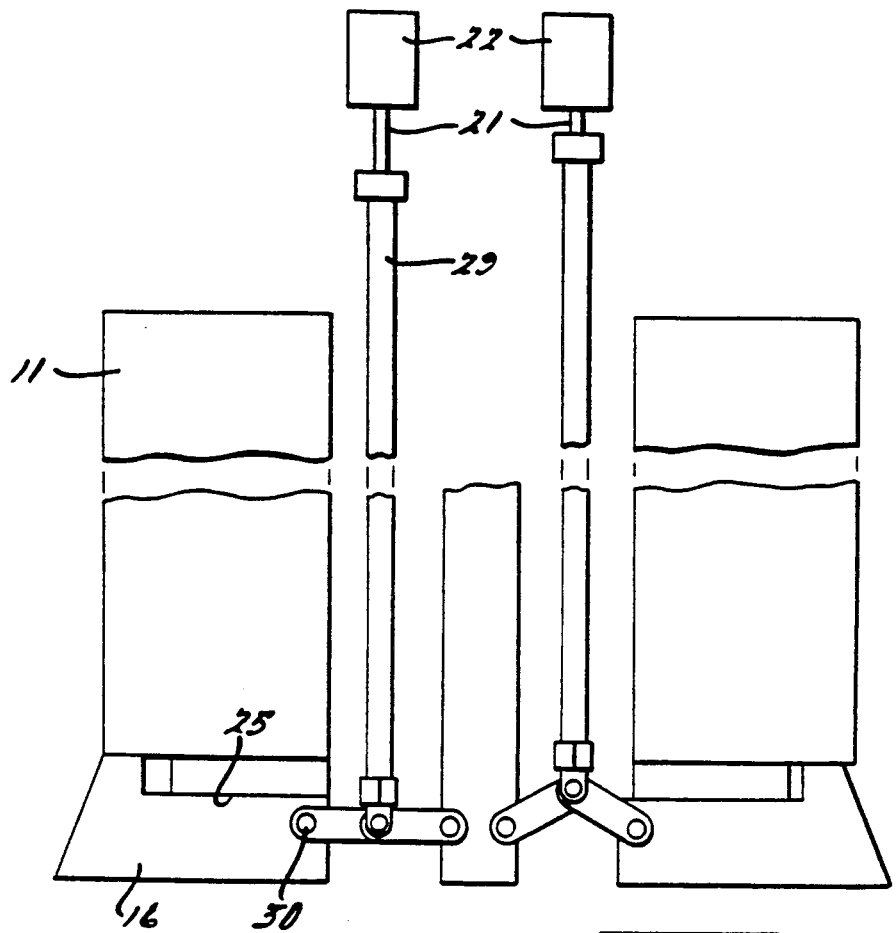
FIG. 18 is a cross sectional view of the seventh embodiment showing a mandrel showing linkage by which to vary the slide's radial position.

FIG. 18 shows another embodiment of a mandrel assembly 11 equipped with an attached radially displaceable slide 16. Actuation is provided externally by an actuator 21 operating directly or indirectly, through a linkage system, upon internal linkage 29 connected to linkage pivot 31. Linkage pivot 31 is connected via linkage to the link-slide interface 30, where the interface 30 is attached to slide 16. Longitudinal motion of linkage 29, parallel to the mandrel assembly 11 axis, is converted to radial sliding motion of slide 16.

FIG. 19 shows an additional embodiment of a slide actuation system where the slides 16 are attached to the mandrel assembly 11. An external actuator 21 acts through a linkage pivot 32 which then engages an axial member 31 which is in contact with the slide 16. On one end of the member 31 is a beveled mating surface 34 with bevel angle corresponding to a slide beveled mating surface 33 located on the radially displaceable slide 16. Movement of the member 31 in a direction opposite the flow of the material (upward in FIG. 19) results in pressure being exerted against the slide 16 by the viscous liquid at the compression zone 17, thereby causing movement of the radially displaceable slide 16 inward and increasing the annular opening 13 at a selected inner circumferential perimeter 14 site. Movement of the member in a direction concurrent with the direction of flow (downward in FIG. 19) causes the beveled mating surface 34 to urge slide 16 radially outward, decreasing the annular opening 13 at that site. Further, axial motion of the entire mandrel assembly 11 can create uniform circumferential changes in the overall annular opening 13. This can be in addition to movement of individual slide 16 movement, creating even greater variations in parison shot wall thicknesses.

A further embodiment is shown in FIG. 20, where hydraulically actuated hydraulic sacs 58 are positioned to radially displace the radially displaceable slide 16. These sacs 58, located on the interior surface of radially displaceable slide 16, expand when hydraulically pressurized and thereby urge the radially displaceable slide 16 into the compression zone 17, reducing the local annular opening 13. After the pressure is relieved, the radially displaceable slide 16 is forced radially inward by the pressure generated in the compression zone 17 so as to enlarge the local annular opening 13. Preferentially, each sac 58 is isolated by an isolation wall 59 or like configuration so as not to influence other sacs 58 or radially displaceable slides 16 in an undesirable or unanticipated fashion.

Any of the actuation devices described herein can be used with any of the embodiments. The presently preferred actuation system is depicted in FIG. 9 which uses a hydraulic actuator 22. Other actuation means may include mechanical cam-type systems, mechanical linkage-type systems, or electromagnetic systems. These systems may be equipped with electronic or computerized controls that provide real time modulation of the segment 16 location such that the circumferential and longitudinal wall thickness of the parison shot may be modified during actual formation of the parison shot. Using computerized controls, complex shaped parison shot configurations may be preprogrammed, affording quick and easy modification of parison shape to suit production requirements as needed, without extensive modification or revisions in the existing hardware.

It is to be understood that the above detailed description of the embodiments of the invention are provided by way of example only. Various details of design and construction may be modified without departing from the true spirit and scope of the invention as set forth in the appended claims.

We claim:

1. A parison forming device, comprising a means defining an orifice creating an outer circumferential perimeter of an annular opening, a mandrel assembly concentric to said orifice, creating an inner circumferential perimeter of said annular opening, and at least one radially displaceable slide, equipped with at least one individual actuator, defining the inner circumferential perimeter of said annular opening, attached to said mandrel assembly, wherein said slide moves radially along radial confines situated within said mandrel assembly and said radial slide's position is established by said actuator situated within said mandrel assembly.

2. A parison forming device, comprising a means defining an orifice creating an outer circumferential perimeter of an annular opening, a mandrel assembly concentric to said orifice, creating an inner circumferential perimeter of an annular opening, and at least one radially displaceable slide, equipped with at least one individual actuator situated within said mandrel assembly, defining at least a portion of the inner circumferential perimeter of said annular opening, attached to said mandrel assembly, wherein said slide moves radially along radial confines situated within said mandrel assembly and said radial slide's position is established by said actuator situated within said mandrel assembly.

3. The invention of claim 1, further comprising at least one projection attaching said slide to said mandrel assembly, wherein said projection's thickness expands as a function of the axial distance from the mandrel assembly and engages a slot in said slide corresponding to said projection, thereby allowing radial, but not axial, motion relative to the axis of said mandrel assembly.

4. The invention of claim 1, wherein said slide is actuated by mechanical means comprising a threaded member protruding through said mandrel assembly and engaging a tapped recess in said slide.

5. The invention of claim 1, wherein said slide is actuated by mechanical means comprising a linkage traversing the entire axial length of said mandrel assembly, said linkage responding to input from an external source and said linkage being in contact with said slide, thereby converting motion axial to said mandrel assembly to radial motion in said slide.

6. The invention of claim 1, wherein said slide is actuated by mechanical means comprising a member traversing the entire axial length of said mandrel assembly, said member responding to input from an external source and said member, via axial motion, imparting radial motion to said slide through reciprocal, beveled mating surfaces on each of said member and slide.

7. The invention of claim 1, wherein said slide is actuated by at least one hydraulic sac located within said mandrel assembly and acting upon said slide whereby sac pressurization and expansion imparts radial motion in said slide.

8. The invention of claim 1, wherein said slide is actuated via electronic means comprising electromagnetic devices engaging said slide.

9. The invention of claim 1, wherein said slide is actuated by hydraulic means comprising hydraulic devices engaging said slide.

10. A parison forming device, comprising a means defining an orifice creating an outer circumferential perimeter of an annular opening, a mandrel assembly concentric to said orifice, creating an inner circumferential perimeter of said annular opening, and at least one radially displaceable slide, equipped with at least one individual actuator, defining said inner circumferential perimeter of said annular opening attached to said mandrel assembly, wherein said slide moves radially along radial confines situated within said mandrel assembly and said slide's radial position is established by said actuator situated within said mandrel assembly, and means to meter said annular opening by radial displacement of said slide relative to its initial position during the formation of the parison.

11. A parison forming device, comprising a means defining an orifice creating an outer circumferential perimeter of an annular opening, a mandrel assembly concentric to said orifice, creating an inner circumferential perimeter of an annular opening, and at least one radially displaceable slide, equipped with at least one individual actuator situated within said mandrel assembly, defining at least a portion of said inner circumferential perimeter of said annular opening attached to said mandrel assembly, wherein said slide moves radially along radial confines situated within said mandrel assembly and said slide's radial position is established by said actuator, and means to meter said annular opening by radial displacement of said slide relative to its initial position during te formation of the parison.

12. The invention of claim 10, further comprising at least one projection attaching said slide to said mandrel assembly, wherein said projection's thickness expands as a function of the axial distance from said mandrel assembly and engages a slot in said slide corresponding to said projection thereby allowing radial, but not axial, motion relative to the axis of said mandrel assembly.

13. The invention of claim 10, wherein said slide is actuated by mechanical means comprising a threaded member protruding through said mandrel assembly and engaging a tapped recess in said slide.

14. The invention of claim 10, wherein said slide is actuated by mechanical means comprising a linkage transversing the entire axial length of said mandrel assembly, said linkage responding to input from an external source and said linkage in contact with said slide, thereby converting motion axial to said mandrel assembly to radial motion in said slide.

15. The invention of claim 10, wherein said slide is actuated by mechanical means comprising a member traversing the entire axial length of said mandrel assembly, said member responding to input from an external source and said member, via axial motion, imparting radial motion to said slide through reciprocal, beveled mating surfaces on each of said member and slide.

16. The invention of claim 10, wherein said slide is actuated via electronic means comprising electromagnetic devices engaging said slide.

17. The invention of claim 10, wherein said slide is actuated by at least one hydraulic sac located within said mandrel assembly and acting upon said slide whereby sac pressurization and expansion imparts radial motion in said slide.

18. The invention of claim 10, wherein said slide is actuated by hydraulic means comprising hydraulic devices engaging said slide.

19. A method for the formation of a cylindrical parison of variable wall thickness, comprising the steps of extruding a hollow parison, and varying a circumferential wall thickness at selected locations about an inner circumference of said parison via movement of at least one radially displaceable slide, equipped with at least one individual actuator, in contact with an interior surface of said extruding parison, wherein said slide moves radially along radial confines situated within a mandrel assembly, and movement of said slide's radial position responds to movement of said actuator located within the periphery of the inner surface of said slide.

20. The invention of claim 19, further comprising at least one projection attaching said slide to said mandrel assembly, wherein said projection's thickness expands as a function of the axial distance from said mandrel assembly and engages a slot in said slide corresponding to said projection thereby allowing radial, but not axial, motion relative to the axis of said mandrel assembly.

21. The invention of claim 19, wherein said slide is actuated by mechanical means comprising a threaded member protruding through a mandrel assembly and engaging a tapped recess in said slide.

22. The invention of claim 19, wherein said slide is actuated by mechanical means comprising a linkage transversing the entire axial length of said mandrel assembly, said linkage responding to input from an external source and said linkage in contact with said slide, thereby converting motion axial to said mandrel assembly to radial motion in said slide.

23. The invention of claim 19, wherein said slide is actuated by mechanical means comprising a member transversing the entire axial length of said mandrel assembly, said member responding to input from an external source and said member, via axial motion, imparting radial motion to said slide through reciprocal, beveled mating surfaces on each of said member and slide.

24. The invention of claim 19, wherein said slide is actuated by at least one hydraulic sac located within said mandrel assembly and acting upon said slide whereby sac pressurization and expansion imparts radial motion in said slide.

25. The invention of claim 19, wherein said slide is actuated via electronic means comprising electromagnetic devices engaging said slide.

26. The invention of claim 19, wherein said slide is actuated by hydraulic means comprising hydraulic devices engaging said slide.

27. A method for the formation of a parison of variable wall thickness, comprising the steps of extruding the hollow parison, varying the circumferential wall thickness at selected locations about the inner circumference of said parison by a movement of at least one radially displaceable slide, equipped with at least one individual actuator, in contact with the interior surface of said extruding parison, wherein said slide moves radially along radial confines situate within a mandrel assembly and movement of said slide's radial position responds to movement of said actuator located within the periphery of the inner surface, and varying the wall thickness at selected locations along the longitudinal axis of said parison during the extrusion process by a movement of said slide.

28. The invention of claim 27, further comprising at least one projection attaching said slide to said mandrel assembly, wherein said projection's thickness expands as a function of the axial distance from said mandrel assembly and engages a slot in said slide corresponding to said projection thereby allowing radial, but not axial, motion relative to the axis of said mandrel assembly.

29. The invention of claim 27, wherein said slide is actuated by mechanical means comprising a threaded member protruding through a mandrel assembly and engaging a tapped recess in said slide.

30. The invention of claim 27, wherein said slide is actuated by mechanical means comprising a linkage transversing the entire axial length of said mandrel assembly, said linkage responding to input from an external source and said linkage being in contact with said slide, thereby converting motion axial to said mandrel to radial motion in said slide.

31. The invention of claim 27, wherein said slide is actuated by mechanical means comprising a member transversing the entire axial length of said mandrel assembly, said member responding to input from an external source and said member, via axial motion, imparting radial motion to said slide through reciprocal, beveled mating surfaces on each of said member and slide.

32. The invention of claim 27, wherein said slide is actuated by at least one hydraulic sac located within a mandrel assembly and acting upon said slide whereby sac pressurization and expansion imparts radial motion in said slide.

33. The invention of claim 27, wherein said slide is actuated via electronic means comprising electromagnetic devices engaging said slide.

34. The invention of claim 27, wherein said slide is actuated by hydraulic means comprising hydraulic devices engaging said slide.

* * * * *